US009521523B1

(12) United States Patent
Bostick et al.

(10) Patent No.: US 9,521,523 B1
(45) Date of Patent: Dec. 13, 2016

(54) PREDICTING LOST DEVICES USING NORMAL USAGE PATTERNS

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/732,869

(22) Filed: Jun. 8, 2015

(51) Int. Cl.
*H04W 24/00* (2009.01)
*H04W 4/02* (2009.01)
*H04M 1/725* (2006.01)
*H04W 68/00* (2009.01)
*H04W 64/00* (2009.01)

(52) U.S. Cl.
CPC ......... *H04W 4/028* (2013.01); *H04M 1/72577* (2013.01); *H04W 64/003* (2013.01); *H04W 68/005* (2013.01)

(58) Field of Classification Search
CPC .. H04W 4/028; H04W 68/005; H04W 64/003; H04M 1/72577
USPC ............................... 455/410–411, 456.1–457
See application file for complete search history.

(56) References Cited

U.S. PATENT DOCUMENTS

| | | | |
|---|---|---|---|
| 7,890,083 B2 | 2/2011 | Chandran | |
| 8,095,150 B2 | 1/2012 | Dunko | |
| 8,494,560 B2 | 7/2013 | Parker | |
| 8,551,186 B1 * | 10/2013 | Strand | G06F 21/74 726/35 |
| 8,600,674 B1 | 12/2013 | Barbeau et al. | |
| 8,789,136 B2 | 7/2014 | Erhart et al. | |
| 8,911,507 B1 * | 12/2014 | Gilbert | H04W 4/028 455/410 |
| 2008/0004036 A1 * | 1/2008 | Bhuta | G01S 5/0252 455/456.1 |
| 2008/0214111 A1 | 9/2008 | Moshir et al. | |
| 2010/0203901 A1 * | 8/2010 | Dinoff | H04W 4/022 455/456.3 |

(Continued)

OTHER PUBLICATIONS

"System and method of finding a lost/stolen mobile device which is not accessible by the owner."; An IP.com Prior Art Database Technical Disclosure; IP.com No. 000223683; Nov. 23, 2012; pp. 1-3.

*Primary Examiner* — Marcus Hammonds
(74) *Attorney, Agent, or Firm* — Walter L. Rudberg

(57) ABSTRACT

A method for predicting lost mobile devices. The method includes, identifying, by one or more processors, one or more pre-designated locations, where each of the one or more pre-designated locations contains devices and a main device to be tracked. The one or more processors receive information from the devices. The one or more processors derive a common usage pattern of the main device based on, the information from the devices. The pattern is associated with a location of the main device. The one or more processors determine whether the main device follows substantially all of the common usage pattern. Finally, in response to determining the main device does not follow substantially all of the common usage pattern, the one or more processors sends at least one different types of alerts to at least one predetermined device of the devices.

20 Claims, 3 Drawing Sheets

(56) References Cited

U.S. PATENT DOCUMENTS

| | | |
|---|---|---|
| 2013/0288710 A1 | 10/2013 | Holley et al. |
| 2014/0082099 A1 | 3/2014 | Burns et al. |
| 2014/0090050 A1 | 3/2014 | Nakajima et al. |
| 2014/0179270 A1 | 6/2014 | Anand |
| 2014/0213301 A1 | 7/2014 | Evans et al. |
| 2014/0273921 A1 | 9/2014 | Li et al. |

* cited by examiner

PREDICTING LOST DEVICES USING NORMAL USAGE PATTERNS

BACKGROUND OF THE INVENTION

The present invention relates generally to mobile communications, and more specifically to automatically providing a notification of a misplaced mobile communication device using pattern recognition.

Electronic mobile computing devices ('mobile devices'), such as cellular phones, smart phones, mobile phones, Wi-Fi phones, laptop computers, tablet computers, netbooks, handheld computers, personal organizers, e-reading devices, gaming devices and the like, provide instantaneous communication and data exchange without geographic constraints. Mobile devices include Near Field Communication (NFC), which provides radio frequency communication by bringing two or more NFC capable devices in proximity with each other, as well as Global Positioning Systems (GPS) wherein mobile devices can monitor their position and present a location on a local or remote display. Such mobile devices may be misplaced, lost, or stolen due to their frequent use, compact size, and high value.

SUMMARY

According to one embodiment of the present invention, a method is provided, the method comprising: identifying, by one or more processors, one or more pre-designated locations, wherein each of the one or more pre-designated locations contains a plurality of devices, including a main device to be tracked; receiving, by the one or more processors, information from the plurality of devices; deriving a common usage pattern of the main device based on, the information from the plurality of devices, wherein the common usage pattern is associated with a location of the main device; determining whether the main device follows substantially all of the common usage pattern; and in response to determining the main device does not follow substantially all of the common usage pattern, sending at least one different type of alert to at least one predetermined device of the plurality of devices.

Another embodiment of the present invention provides a computer program product for message transfer, based on the method described above.

Another embodiment of the present invention provides a computer system for message transfer, based on the method described above.

DETAILED DESCRIPTION

Mobile devices have become an essential part of daily life. The small size of mobile devices allows them to be easily portable. However, the portable nature of mobile devices facilitates such devices to occasionally be misplaced, lost, or stolen.

Misplacement, as used hereinafter, encompasses the user's mere forgetfulness of the place the device was left, unintentionally leaving the device in a public or remote area, the wrongful taking of the device by a third party from the user without the user's consent, and the like. Additionally, a misplaced device may be any device of which its rightful user is, for any reason, no longer in possession of the device. In any event, misplacement of the device deprives the rightful user of the device until the device is retrieved.

Therefore, it is desirable for a proactive approach, wherein the user is alerted if the device is misplaced, allowing the user to take quicker corrective action to locate the misplaced device before it is lost and/or stolen. Embodiments of the present invention provide systems and methods of providing a proactive and predictive approach in warning a mobile device user to take corrective action to locate a misplaced device before it is lost, based on a user's specific pattern of use. Embodiments of the present invention provide methods, systems, and computer program products for predicting and notifying a user of a lost mobile device based on a learned pattern of device use and proximity to other known devices.

Figure 1:
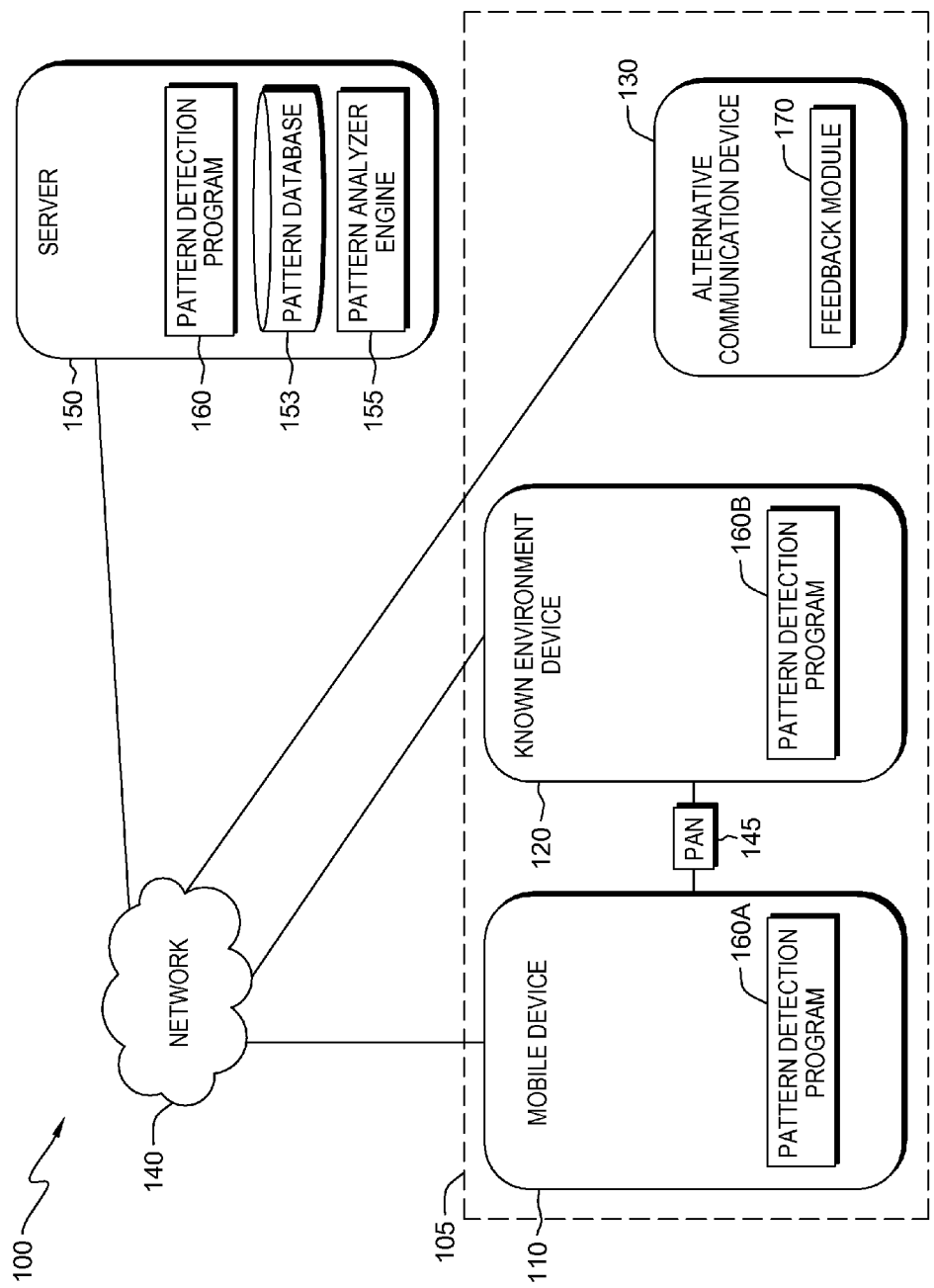
FIG. 1 is a functional block diagram illustrating an environment, in accordance with an embodiment of the present invention.

The present invention will now be described in detail with reference to the Figures. FIG. 1 is a functional block diagram depicting environment 100, in accordance with one embodiment of the present invention. FIG. 1 provides only an illustration of one embodiment and does not imply any limitations with regard to the environments in which different embodiments may be implemented. Many modifications to the depicted environment may be made by those skilled in the art without departing from the scope of the invention, as recited by the claims.

In the depicted embodiment, environment 100 includes server 150 and checkpoint 105, which contains mobile device 110, known environment device 120, and alternative communication device 130, all interconnected over network 140.

Network 140 may be a local area network (LAN), a wide area network (WAN), such as the Internet, the public switched telephone network (PSTN), a mobile data network (e.g., wireless Internet provided by a third or fourth generation of mobile phone mobile communication), a private branch exchange (PBX), any combination thereof, or any combination of connections and protocols that will support communications between mobile device 110, known environment device 120, alternative communication device 130, and server 150, in accordance with embodiments of the invention. Network 140 may include wired, wireless or fiber optic connections. Environment 100 may include additional computing devices, servers or other devices not shown.

Similar to network 140, PAN 145 may be a computer network with a small geographic scope. Computer networks with a small geographic scope range from NFC to Local Area Networks (LANs). A computer network with a small geographic scope typically does not have a connection to the Internet or other remote networks. PAN 145 can be used for communication among mobile devices themselves (intrapersonal communication) or for connecting to a higher level network (e.g., the Internet). A wireless personal area network (WPAN) is a PAN carried over wireless network technologies such as Bluetooth® or peer-to-peer communications over a wireless LAN (Bluetooth is a registered trademark of Bluetooth SIG, Inc.). In embodiments of the present invention, mobile device 110 and known environment device 120 each have the necessary hardware to allow for communication over any preconfigured type of PAN 145 used for communication between them (e.g., a Bluetooth radio).

In the exemplary embodiment, checkpoint 105 includes mobile device 110, known environment device 120, and alternative communication device 130. The devices within checkpoint 105 can communicate with server 150 over network 140. Additionally, checkpoint 105 can facilitate communication between the devices within checkpoint 105. For example, mobile device 110 and at least one known environment device 120 can communicate with each other within checkpoint 105. Checkpoint 105 can be, for example, the home, a personal vehicle used for transportation, or a place of work. In other embodiments, more than one checkpoint may be implemented within environment 100.

Mobile device 110 may be any electronic mobile computing device capable of instantaneous communication and data exchange, and capable of communicating with server 150 over network 140. For example mobile device 110 includes, but is not limited to, cellular phones, smart phones, mobile phones, Wi-Fi phones, laptop computers, tablet computers, desktop computers, handheld computers, netbooks, personal organizers, e-reading devices, and the like. Mobile device 110 can recognize nearby known environment device 120 through Personal Area Network (PAN) 145, Bluetooth®, NFC, or any other method wherein a mobile device can recognize other nearby devices within a given checkpoint 105. Mobile device 110 contains pattern detection program 160A.

Known environment device 120 may be any electronic mobile computing device capable of instantaneous communication and data exchange, and capable of communicating with server 150 over network 140. Examples of known environment device 120 include: cellular phones, smart phones, mobile phones, Wi-Fi phones, laptop computers, tablet computers, desktop computers, handheld computers, netbooks, personal organizers, e-reading devices, smart TV's gaming devices, and the like. Each known environment device 120 is located in a specific checkpoint 105. In this exemplary embodiment, known environment device 120 can recognize nearby mobile device 110 through PAN 145, wireless personal area network (WPAN), carried over wireless technologies, such as Bluetooth, NFC, or any other method wherein a mobile device can recognize other nearby devices within a given checkpoint 105. Known environment device 120 includes pattern detection program 160B.

For example, if checkpoint 105 is the user's home, known environment device 120 may be his home computer, home tablet, home smart TV, or any other device on which pattern detection program 160B can operate and connect to network 140. Similarly, if checkpoint 105 is the user's place of work, then known environment device 120 may be his office computer, office laptop, office smart phone, or any other device on which pattern detection program 160B can operate and connect to network 140. In another example, if checkpoint 105 is the user's vehicle, then known environment device 120 may be his navigation system, the vehicle's innate cellular data program, or any other device on which pattern detection program 160B can operate.

Alternative communication device 130 may be any electronic device capable of instantaneous communication and data exchange, and capable of communicating with server 150 over network 140. Alternative communication device 130 may be a vehicle hands free audio system, a computer, a smart watch, a smart TV, SMS, and the like. The type of alternative communication device 130 is dependent on checkpoint 105. Each checkpoint (e.g., home, office, car) has at least one designated alternative communication device 130. Alternative communication device 130 includes feedback module 170.

Feedback module 170 can alert a user through numerous means (e.g., user interface, audio feedback, haptic feedback, visual alerts, etc.) that mobile device 110 has been misplaced. Feedback module 170 receives a signal from pattern detection program 160 to notify the user through a predetermined means, when there is a deviation in the normal use pattern of mobile device 110. Feedback module 170 notifies the user via numerous methods when there is a deviation in the normal use pattern of mobile device 110. Feedback module 170 may involve an audio, haptic, and/or visual alerts, etc. Alternatively feedback module 170 may also utilize a user interface, wherein an e-mail, or similar message type is sent to a specific receiver source, thereby alerting the user. Additionally, in each checkpoint, the user can have a different device notify the user, if mobile device 110 is misplaced. For example, at the home checkpoint, the misplaced mobile device notification may be sent by feedback module 170 of a designated home alternative communication device 130; whereas at the work checkpoint the misplaced mobile device notification may be sent by feedback module 170 of a designated work alternative communication device 130.

In other embodiments, alternative communication device 130 and known environment device 120 can be combined into a single device. Thus, feedback module 170, pattern detection program 160B, and a means to connect to PAN 145 are contained within known environment device 120. Therefore, if a pattern deviation is detected, pattern detection program 160 can be configured to alert the user via feedback module 170 contained within a specific known environment device 120.

In the exemplary embodiment, server 150 is a server computer. In other embodiments, server 150 may be a management server, a web server or any other electronic device capable of receiving and sending data. In another embodiment, server 150 may represent a server computing system utilizing multiple computers as a server system, such as in a cloud computing environment. Server 150 contains pattern detection program 160, pattern database 153, and pattern analyzer engine 155.

Figure 3:
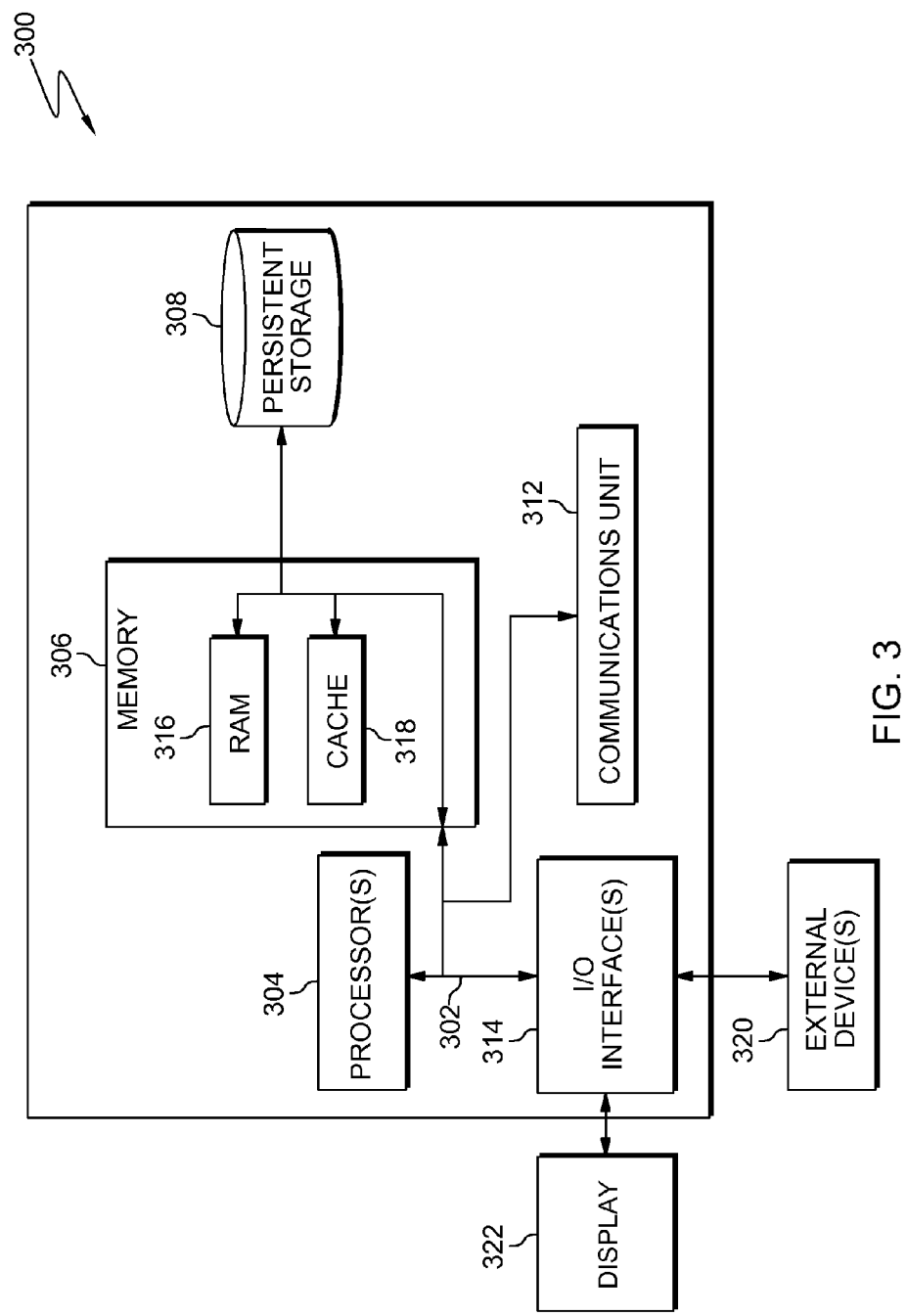
FIG. 3 is a block diagram of internal and external components of the computer systems of FIG. 1, in accordance with an embodiment of the present invention.

Mobile device 110, known environment device 120, alternative communication device 130, and server 150 may each include components as depicted in further detail with respect to FIG. 3.

In this exemplary embodiment, pattern detection programs 160A and 160B are programs that run in the background of their respective devices. Pattern detection programs 160A and 160B are different representations of the same application on different devices. Specifically, pattern detection programs 160A and 160B operate generally to connect mobile device 110 to known environment device 120, when mobile device 110 and known environment device 120 are at the same checkpoint (e.g., able to recognize other devices over a personal area network). Pattern detection programs 160A and 160B can track current geological locations and proximity to known environment device(s) 120 and send such information, at predetermined time intervals, to pattern detection program 160, located on server 150, via network 140.

In this exemplary embodiment, pattern detection program 160 operates generally to provide support functions for pattern detection programs 160A and 160B. Such support functions may include receiving, forwarding, and managing all information between mobile device 110, known environment device 120, alternative communication device 130 (if applicable), as well as other devices not depicted in environment 100. Pattern detection program 160 communicates and provides alerts through feedback module 170.

Pattern database 153 can be implemented using any database architecture known in the art such as, for example, a relational database, an object-oriented database, and/or one or more tables. Pattern database 153 stores all information received from mobile device 110 and known environment device 120. Information stored in pattern database 153 contains at least: checkpoint location, date, and time information for all devices running pattern detection program (e.g., only two devices depicted in FIG. 1). Additional information stored on pattern database 153 includes information detailing when mobile device 110 and known environment device 120 are near each other in a given checkpoint.

Pattern analyzer engine 155 analyzes all information contained in pattern database 153 relating to a specific user's mobile device 110, within each designated checkpoint 105. Pattern analyzer engine 155 detects use patterns of mobile device 110 in proximity to known environment device 120, within a given checkpoint 105 at a given day and time. Pattern analyzer engine 155 uses an algorithm to identify and determine within a specific checkpoint 105 on a specific day, date, and/or time, which known environment device(s) 120 are typically near mobile device 110. Thereby, if a deviation in pattern is detected by pattern analyzer engine 155, pattern detection program 160 sends a predetermined type of alert to alternative communication device 130, via network 140. Such alert notifies the user that mobile device 110 has been misplaced, allowing the user to recover the device before it is lost or stolen.

For example, a user's smart phone (e.g., mobile device 110) and a user's laptop (e.g., known environment device 120) are located at the user's place of work (e.g., within the same checkpoint 105), and both devices are connected using PAN 145. Both the user's smart phone and the user's laptop transmit a recognition of the other device along with the location and time, at predetermined intervals, to server 150 through network 140. However, for example, if only the user's laptop is located within the user's place of work, then the user's laptop transmits, at predetermined intervals, that no other device(s) are present within the user's place of work, along with the specific date and time information, to server 150 through network 140.

In both of the aforementioned examples, device information is collected by pattern detection program 160 then stored in pattern database 153. Pattern analyzer engine 155 creates normal pattern of use parameters and searches pattern database 153 for deviations from the normal pattern of use parameters. Upon detection of a deviation by pattern analyzer engine 155, pattern detection program 160 sends a message to feedback module 170, within alternative communication device 130, alerting the user that mobile device 110 may be misplaced.

In other embodiments, there may be additional known environment devices 120 within each pre-designated checkpoint 105 connected to server 150 through network 140. All additional known environment devices 120 are able to interconnect with each other, as well as mobile device 110, via PAN 145.

Figure 2:
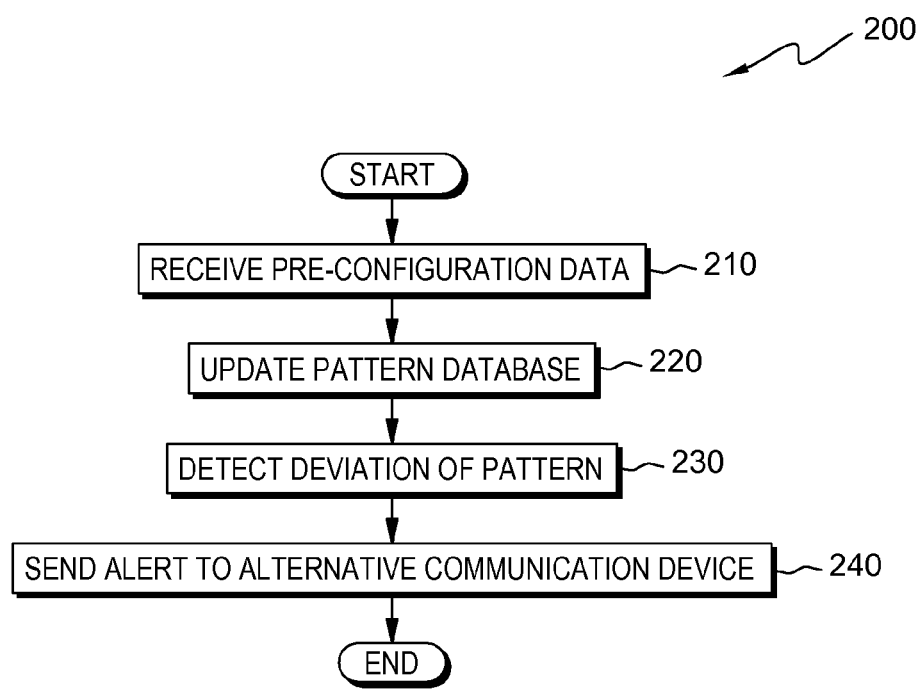
FIG. 2 is a flowchart illustrating operational steps for detecting and notifying a user of a misplaced device, executing within the environment of FIG. 1, in accordance with an embodiment of the present invention.

FIG. 2 depicts flowchart 200 illustrating operational steps of pattern detection program 160 for detecting and notifying a user of a misplaced device, executing within the environment of FIG. 1, in accordance with one embodiment of the present invention.

In this exemplary embodiment, three checkpoints are used as examples illustrating certain features of the presently described invention: the user's home, the user's office, and the user's vehicle.

In step 210, pattern detection program 160 receives pre-configuration data from all connected programs and from a user. Pre-configuration of pattern detection program 160 is conducted independently on mobile device 110 and each known environment device 120, as well as alternative communication device 130 (if such device is located in the checkpoint).

A user of mobile device 110 activates and configures pattern detection program 160A. For example, a user can configure mobile device 110 to a multitude of settings involving, but not limited to, safe locations for the user (specific common locations—home, work, etc.), specific travel areas, how often alerts are sent to the user, frequency of inter-device communications, communications with the server, and automatic and/or manual actions to take if the mobile device is misplaced, etc.

When pattern detection program 160A is activated on mobile device 110, one embodiment allows the user to set certain checkpoints 105 in which mobile device 110 will learn the common environments, such as the user's home, office, vehicle or even certain geographical areas, such as a neighborhood, city, state or even country.

In some embodiments, pattern detection program 160A is configured to allow a user to remotely wipe all data contained on the mobile device in the event the device is lost. Similarly, in other embodiments, a user can remotely copy and/or transfer data from device 110 to another device when the mobile device is misplaced. In yet another embodiment, the user can remotely turn on a GPS or other similar known means to track the location of the device in order to retrieve the misplaced mobile device 110. The user can also configure pattern detection program 160A to lock mobile device 110 using any known method of locking the device such as: password, voice recognition, facial recognition, retinal scan, finger print identification, or any other security protection of the like.

Although many internal settings are configured prior to use, settings can be changed at a later point by the user through a pattern detection program interface.

A user may also activate and configure pattern detection program 160B on each known environment device 120, within each commonly used checkpoint 105. Each known environment device 120 is registered to know which checkpoint it belongs to. For example, 'home computer' knows it is located within the 'home' checkpoint, whereas, the user's work computer is identified as being located in the user's place of work.

In step 220, pattern detection program 160 updates pattern database 153. Mobile device 110 and all known environment devices 120 continuously send data to pattern detection program 160, at pre-determined intervals. In this exemplary embodiment, pattern analyzer engine 155 sorts through pattern database 153 and generates a normal pattern of use of mobile device 110, based on the location of mobile device 110, responsive to receiving new data from mobile device 110 and known environment devices 120. For example, pattern analyzer engine 155 detects a normal use pattern if, from 8:00 am to 5:00 pm, Monday through Friday, mobile device 110 is located at a user's office checkpoint 105. Such a pattern is observed when mobile device 110 is always paired with known environment device 120, (for example, user's office computer), at certain date/time intervals. In another example, patent analyzer engine 155 detects a pattern if, whenever known environment device 120 is located within a user's vehicle checkpoint 105, (for instance the vehicle's navigation system) and it is on, it is always connected to mobile device 110. As mobile device 110 and all known environment devices 120 continue to send updated data to pattern detection program 160, the normal pattern of use of mobile device 110 becomes more accurate, thereby providing an efficient and expedited warning to the user, if mobile device 110 is misplaced.

In step 230, pattern detection program 160 detects that there is a deviation of the normal pattern of use. In this exemplary embodiment, a deviation from a pattern can be detected if mobile device 110 is not at a location within the normal pattern of use. For example, a normal use pattern reveals that whenever a user is at the vehicle checkpoint 105, the user always has mobile device 110 with him. However a deviation is detected if known environment device 120 does not detect mobile device 110 within vehicle checkpoint 105. In another example, if mobile device 110 is in a new location or outside the pre-configuration location, a deviation is detected as it is not in a normal pattern of use.

In another embodiment, a deviation from the pattern of normal use is detected when the mobile device is in a specific location when it is usually not within the location. For example, if a normal use pattern reveals that mobile device 110 is never within home checkpoint 105 during 9:00 am to 4:00 pm on Mondays, and known environment device 120 detects mobile device 110 within a home checkpoint at 10:00 am on a Monday, then a deviation from the normal use pattern is detected.

In yet another embodiment, a deviation from the pattern of normal use is detected when a device is not in a specific location when it usually is. For instance, if the normal use pattern determines that mobile device 110 is usually within work checkpoint 105 during 9:00 am to 4:00 pm on Mondays, and known environment device 120 does not detect mobile device 110 within checkpoint at 10:00 am on a Monday, then a deviation from the normal use pattern is detected.

In step 240, pattern detection program 160 sends an alert to alternative communication device 130 in response to detecting a deviation from the normal use pattern. In this exemplary embodiment, when a deviation of the normal use pattern is detected by pattern analyzer engine 155, pattern detection program 160 informs the user that mobile device 110 is misplaced via feedback module 170. Pattern detection program 160 takes certain actions depending on its earlier established configurations.

For example, if a given checkpoint is the user's vehicle, and known environment device 120 does not detect mobile device 110, then feedback module 170 can alert the user. In the above example, if the vehicle navigation system (known environment device 120) does not detect mobile device 110, then pattern detection program 160 may be configured to have vehicle navigation system (acting as alternative communication device 130) inform the user that mobile device is misplaced.

Pattern detection program 160 can be configured to alert the user in numerous ways, depending on earlier established configurations. For example, if a deviation is detected at office checkpoint 105, pattern detection program 160 can be configured to send an email to the user through feedback module 170 of alternative communication device 130. Similarly, pattern detection program 160 can be configured to send an SMS message to the user's mobile phone, or send a pop-up message to the user's smart TV, through feedback module 170 of alternative communication device 130.

In other embodiments, if a specific type of user defined deviation occurs, pattern detection program 160 can be configured to take certain actions. For instance, the configuration can remotely wipe all data contained on the mobile device; remotely turn on a GPS or other similar known means to manually track mobile device 110 location; lock mobile device 110 using any known method of locking device such as: password, voice recognition, facial recognition, rental scan, finger print identification, or any other security protection of the like.

In another embodiment, when a specific deviation occurs regularly, and the user habitually disregards the alert, pattern analyzer engine 155 learns that the user does not consider this mobile device 110 misplaced, and no longer considers that specific deviation (which activated the alert) a deviation from the normal pattern of use.

For example, in the home checkpoint 105 the user's mobile device 110 may be a tablet. Known environment devices 120 may consist of a home computer, a laptop, user's smart phone and a smart TV. The alternative communication device 130 is the user's smart watch. If the tablet (mobile device 110) is always in the home checkpoint 105, all the aforementioned known environment devices 120 are all connected to the tablet (step 220). If someone steals the tablet, the user is immediately notified via audible and haptic alerts on the user's smart watch (alternative communication device 130), when none of the known environment devices 120 are able to connect to the tablet, regardless if the user is within the home checkpoint 105.

In another example, the checkpoint is the user's vehicle, and the user's mobile device 110 may be a smart phone. Known environment device 120 may include the vehicle's hands free system. The alternative communication device 130 is the vehicle's navigation system. A normal use pattern is identified when the user always has his smart phone with him when he enters the vehicle. Therefore, a deviation in the normal use pattern occurs if the user enters the vehicle without his smart phone, for instance if the user leaves the smart phone in a store. Upon detection of the normal use pattern deviation, feedback module 170 of the vehicle's navigation system (alternative communication device 130) verbally informs the user that the smart phone (mobile device 110) may be misplaced. This allows the user to retrieve his smart phone before ever leaving the parking lot, thereby minimizing the potential for theft of the smart phone.

In yet another example, the checkpoint is the user's office, and the user's mobile device 110 may be a smart phone. Known environment device 120 may include the user's work computer. The alternative communication device 130 is also the user's work computer. The smart phone (mobile device 110) is always in the office checkpoint 105 between 8:00 am and 12:00 pm and 1:00 pm though 5:00 pm, Monday through Friday. A normal use pattern is identified when the user always has his smart phone with him while he is at work, near his work computer. Therefore, a deviation in the normal use pattern occurs if the user returns from his lunch break without his smart phone. Upon detection of the normal use pattern deviation, feedback module 170 sends an email to the user's work computer (i.e., known environment device 120 and alternative communication device 130), alerting the user that the smart phone (mobile device 110) may be misplaced. This allows the user to expeditiously recover his smart phone.

FIG. 3 is a block diagram of internal and external components of a computer system 300, which is representative the computer systems of FIG. 1, in accordance with an embodiment of the present invention. It should be appreciated that FIG. 3 provides only an illustration of one implementation and does not imply any limitations with regard to the environments in which different embodiments may be implemented. In general, the components illustrated in FIG. 3 are representative of any electronic device capable of executing machine-readable program instructions. Examples of computer systems, environments, and/or configurations that may be represented by the components illustrated in FIG. 3 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 300 includes communications fabric 302, which provides for communications between one or more processors 304, memory 306, persistent storage 308, communications unit 312, and one or more input/output (I/O) interfaces 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 316 and cache memory 318. In general, memory 306 can include any suitable volatile or non-volatile computer readable storage media. Software (e.g., pattern detection programs 160, 160A, and 160B, etc.) is stored in persistent storage 308 for execution and/or access by one or more of the respective processors 304 via one or more memories of memory 306.

Persistent storage 308 may include, for example, a plurality of magnetic hard disk drives. Alternatively, or in addition to magnetic hard disk drives, persistent storage 308 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 308 can also be removable. For example, a removable hard drive can be used for persistent storage 308. Other examples include optical and magnetic disks, thumb drives, and smart cards that are inserted into a drive for transfer onto another computer readable storage medium that is also part of persistent storage 308.

Communications unit 312 provides for communications with other computer systems or devices via a network (e.g., network 140). In this exemplary embodiment, communications unit 312 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to server 150 through communications unit 312 (e.g., via the Internet, a local area network or other wide area network). From communications unit 312, the software and data can be loaded onto persistent storage 308.

One or more I/O interfaces 314 allow for input and output of data with other devices that may be connected to computer system 300. For example, I/O interface 314 can provide a connection to one or more external devices 320 such as a keyboard, computer mouse, touch screen, virtual keyboard, touch pad, pointing device, or other human interface devices. External devices 320 can also include portable computer readable storage media such as, for example, thumb drives, portable optical or magnetic disks, and memory cards. I/O interface 314 also connects to display 322.

Display 322 provides a mechanism to display data to a user and can be, for example, a computer monitor. Display 322 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   identifying, by one or more processors, a main device associated with a user, at least a first known environment device at a first checkpoint location, and a second known environment device at a second checkpoint location, wherein the at least first known environment device and the second known environment device are capable of communicating with the main device;
   receiving, by the one or more processors, location and time information from the at least first known environment device after recognizing that the main device is located within the first checkpoint location and the second known environment device after recognizing that the main device is located within the second checkpoint location;
   deriving, by the one or more processors, a common usage pattern of the main device, based on the location and time information, wherein the common usage pattern projects an expected location of the main device at a known time;
   determining, by the one or more processors, whether the main device deviates from the derived common usage pattern by determining whether the main device is located at the expected location at the known time; and
   in response to determining the main device deviates from the common usage pattern, sending, by the one or more processors, an alert for the user, wherein the alert is sent to the at least first known environment device when the common usage pattern projects the expected location of the main device should correspond with the first checkpoint location and the second known environment device when the common usage pattern projects the expected location of the main device should correspond with the second checkpoint location.

2. The method of claim 1, wherein the first known environment device at the first checkpoint location is placed within at least two of the following locations:
   a home, a vehicle, or a place of work.

3. The method of claim 1, wherein receiving location and time information, comprises:
 creating, by the one or more processors, a first personal area network within the first checkpoint location; and
 creating, by the one or more processors, a second personal area network within the second checkpoint location.

4. The method of claim 1, wherein deriving the common usage pattern of the main device comprises:
 analyzing, by the one or more processors, a set of parameters associated with the common usage pattern, wherein the set of parameters are based, at least in part, on a day, a date, a time, the first checkpoint location, the second checkpoint location, and the at least first known environment device.

5. The method of claim 1, further comprising:
 in response to determining the main device deviates from the common usage pattern, configuring, by the one or more processors, the main device to implement at least one of the following:
 remotely lock the main device, and
 remotely wipe memory of the main device.

6. The method of claim 1, further comprising:
 receiving, by the one or more processors, a first set of information from the at least first known environment device at predetermined time intervals, wherein the set of information comprises a notification of whether the main device is located within the first checkpoint location, and a second set of information from the at least second known environment device at predetermined time intervals, wherein the set of information comprises a notification of whether the main device is located within the second checkpoint location.

7. The method of claim 1, further comprising:
 modifying, by the one or more processors, the derived common usage pattern of the main device, based in part on at least one of the following:
 identifying, by the one or more processors, a new usage pattern of the main device based on the location and time information of the main device; and
 receiving, by the one or more processors, an override from the user, wherein the override suspends the derived common usage pattern, for a predetermined period of time, and implements the new usage pattern.

8. The method of claim 1, wherein, a deviation of the common usage pattern occurs when the main device is not located at a corresponding checkpoint location as derived by the common usage pattern.

9. A computer program product comprising a computer readable storage medium and program instructions stored on the computer readable storage medium, the program instructions comprising:
 program instructions to identify a main device associated with a user, at least a first known environment device at a first checkpoint location, and a second known environment device at a second checkpoint location, wherein the at least first known environment device and the second known environment device are capable of communicating with the main device;
 program instructions to receive location and time information from the at least first known environment device after recognizing that the main device is located within the first checkpoint location and the second known environment device after recognizing that the main device is located within the second checkpoint location;
 program instructions to derive a common usage pattern of the main device, based on the location and time information, wherein the common usage pattern projects an expected location of the main device at a known time;
 program instructions to determine whether the main device deviates from the derived common usage pattern by determining whether the main device is located at the expected location at the known time; and
 in response to determining the main device deviates from the common usage pattern, program instructions to send an alert for the user, wherein the alert is sent to the at least first known environment device when the common usage pattern projects the expected location of the main device should correspond with the first checkpoint location and the second known environment device when the common usage pattern projects the expected location of the main device should correspond with the second checkpoint location.

10. The computer program product of claim 9, wherein the first known environment device at the first checkpoint location is placed within at least two of the following locations:
 a home, a vehicle, or a place of work.

11. The computer program product of claim 9, wherein receiving location and time information, comprises:
 program instructions to create a first personal area network within the first checkpoint location; and
 program instructions to create, by the one or more processors, a second personal area network within the second checkpoint location.

12. The computer program product of claim 9, wherein deriving the common usage pattern of the main device comprises:
 program instructions to analyze a set of parameters associated with the common usage pattern, wherein the set of parameters are based, at least in part, on a day, a date, a time, the first checkpoint location, the second checkpoint location, and the at least first known environment device.

13. The computer program product of claim 9, further comprising:
 in response to determining the main device deviates from the common usage pattern, program instructions to configure the main device to implement at least one of the following:
 remotely lock the main device, and
 remotely wipe memory of the main device.

14. The computer program product of claim 9, further comprising:
 program instructions to modify the derived common usage pattern of the main device, based in part on at least one of the following:
 program instructions to identify a new usage pattern of the main device based on the location and time information of the main device; and
 program instructions to receive an override from the user, wherein the override suspends the derived common usage pattern, for a predetermined period of time, and implements the new usage pattern.

15. A computer system comprising:
 one or more computer processors;
 one or more computer readable storage media;
 program instructions stored on the one or more computer readable storage media for execution by at least one of the one or more processors, the program instructions comprising:
 program instructions to identify a main device associated with a user, at least a first known environment device at a first checkpoint location, and a second known environment device at a second checkpoint location, wherein the at least first known environment device and the second known environment device are capable of communicating with the main device;

program instructions to receive location and time information from the at least first known environment device after recognizing that the main device is located within the first checkpoint location and the second known environment device after recognizing that the main device is located within the second checkpoint location;

program instructions to derive a common usage pattern of the main device, based on the location and time information, wherein the common usage pattern projects an expected location of the main device at a known time;

program instructions to determine whether the main device deviates from the derived common usage pattern by determining whether the main device is located at the expected location at the known time; and in response to determining the main device deviates from the common usage pattern, program instructions to send an alert for the user, wherein the alert is sent to the at least first known environment device when the common usage pattern projects the expected location of the main device should correspond with the first checkpoint location and the second known environment device when the common usage pattern projects the expected location of the main device should correspond with the second checkpoint location.

16. The computer system of claim 15, wherein the first known environment device at the first checkpoint location is placed within at least two of the following locations:
a home, a vehicle, or a place of work.

17. The computer system of claim 15, wherein receiving location and time information, comprises:
program instructions to create a first personal area network within the first checkpoint location; and
program instructions to create, by the one or more processors, a second personal area network within the second checkpoint location.

18. The computer system of claim 15, wherein deriving the common usage pattern of the main device comprises:
program instructions to analyze a set of parameters associated with the common usage pattern, wherein the set of parameters are based, at least in part, on a day, a date, a time, the first checkpoint location, the second checkpoint location, and the at least first known environment device.

19. The computer system of claim 15, further comprising:
in response to determining the main device deviates from the common usage pattern, program instructions to configure the main device to implement at least one of the following:
remotely lock the main device, and
remotely wipe memory of the main device.

20. The computer system of claim 15, further comprising:
program instructions to modify the derived common usage pattern of the main device, based in part on at least one of the following:
program instructions to identify a new usage pattern of the main device based on the location and time information of the main device; and
program instructions to receive an override from the user, wherein the override suspends the derived common usage pattern, for a predetermined period of time, and implements the new usage pattern.

* * * * *